June 8, 1954     C. E. CREDE     2,680,585
VIBRATION ISOLATOR
Filed Nov. 3, 1950

Inventor,

Charles E. Crede

Patented June 8, 1954

2,680,585

UNITED STATES PATENT OFFICE 2,680,585

VIBRATION ISOLATOR

Charles E. Crede, Winchester, Mass., assignor to The Barry Corporation, a corporation of Massachusetts Application November 3, 1950, Serial No. 193,840

5 Claims. (Cl. 248—21)

My invention relates to flexible mountings, known as vibration isolators, which are used to effect a reduction in the magnitude of vibration transmitted between structures which must be mechanically connected. In applications where the operation of machinery causes a vibrating force to be created within the machinery, isolators may be employed to reduce the magnitude of the force transmitted to the support for the machinery. In other applications, machinery or equipment is mounted upon a support which vibrates, and an isolator is employed to reduce the severity of vibration transmitted from the support to the equipment.

Isolators are used in aircraft for mounting delicate equipment. They protect the equipment from the vibration created by operation of the engine, by aerodynamic forces acting upon the aircraft structure, by gunfire of the plane's armament, and by taxiing, landing and taking off.

The important elements of a vibration isolator for such applications are (1) a relatively compliant spring or other resilient element for carrying the weight of the equipment, (2) a snubber to cushion the equipment when it is moved a large distance from its neutral position and (3) a damper to reduce the duration of transient vibration of the mounted equipment.

An object of my invention is to provide a vibration isolator constructed entirely of material whose operation and endurance are not adversely affected by the extremely high and extremely low temperatures sometimes encountered in aircraft operation.

Another object of my invention is to provide a vibration isolator equipped with a snubber or snubbers which cushion the mounted equipment after it has been displaced a certain distance in any direction.

A further object is to provide a vibration isolator which is equipped with a damper for subtracting energy from a vibrating system, thereby reducing the time during which transient vibration exists.

Other objects and advantages of my invention will be apparent from the following detailed description taken in conjunction with the accompanying drawings wherein.

Figure 1:
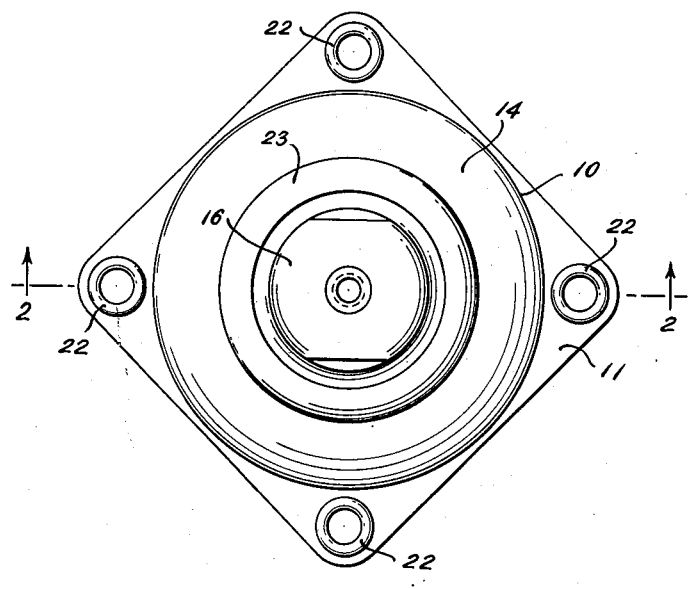
Figure 1 is a plan view of an isolator showing a preferred embodiment of my invention.
Figure 2:
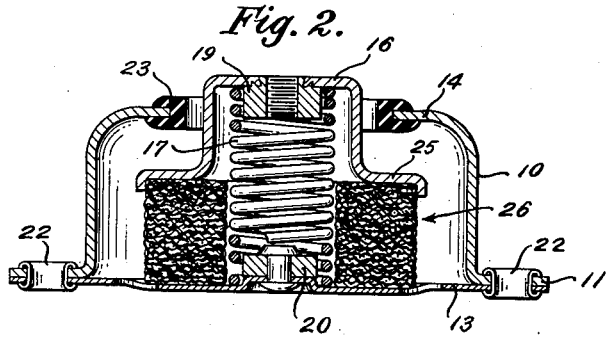
Figure 2 is a section on line 2—2 of Figure 1.
Figure 3:
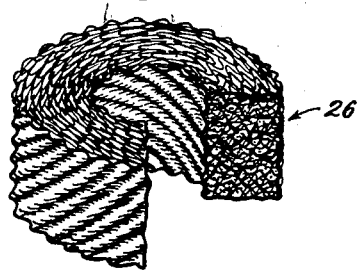
Figure 3 is a partially cut away perspective view of the damper included in the isolator illustrated in Figures 1 and 2.

The isolator includes a substantially cylindrical housing 10 with a lower peripheral flange 11 to which a bottom plate 13 is eyeletted. The upper wall 14 of the housing is provided with an opening through which one end of an inverted cup 16 is inserted. The main load supporting spring 17 extends between the bottom plate 13 and the inverted cup 16. The spring 17 is centered in the cup 16 by a tapped boss 19 swaged to the cup; it is located at its bottom end by another boss 20 riveted to the bottom plate 13. The mounted equipment is attached to the isolator by a bolt which threads into the tapped boss 19, and the isolator is attached to the aircraft structure by means of bolts extending through the eyelets 22. A rubber snubber 23 is provided around the opening in the upper wall 14 of the housing 10 to cushion extreme motion of the mounted equipment.

The inverted cup 16 is provided with a peripheral flange 25 on its lower edge. A compliant damper 26 is arranged to encircle the lower part of the spring 17 and is confined between the peripheral flange 25 and the bottom plate 13. The damper is thus compressed by downward vibratory movement of the mounted equipment, and is permitted to extend when the vibrating body moves upwardly. The damper may be formed of interlocked wires, preferably of corrosion resistant material which rub on one another as compression and extension of the damper occurs. These wires also tend to bulge inwardly during compression and rubbing on the coils of the spring 17. The friction involved in this rubbing takes energy from the vibrating system and imposes a restriction on the amplitude of the vibration which may occur.

While but one embodiment of my invention has been shown and described, it will be understood that many changes and modifications may be made therein without departing from the spirit and scope of the invention as defined in the appended claims.

I claim:

1. In a vibration isolator, the combination of a housing having an opening in the top thereof, a resilient load supporting element disposed at least partially within said housing and having one end extending through said opening, means associated with said element for receiving a supported load, a tubular damper of foraminous metallic material encircling at least the lower part of said load supporting element and spaced inwardly from the side wall of said housing, and means to deflect said damper vertically upon vertical deflection of said resilient load supporting element.

2. In a vibration isolator, the combination of a housing having a base and an opening in the top thereof, an inverted cup projecting upwardly through said opening, normally out of contact with said housing and having a peripheral flange larger than said opening disposed within said housing, a resilient load supporting element having one end seated within said cup and the other end supported by said base, means for attaching said cup to a supported load, and a tubular damper of knitted metallic material encircling at least the lower part of said resilient load supporting element, and spaced inwardly from the side wall of said housing; and having its upper end normally engaging said cup and its lower end supported by said base whereby said damper is deflected vertically by said cup upon vertical deflection of said resilient load supporting element.

3. The combination of claim 2 wherein the resilient load supporting element comprises a coil spring and the inside diameter of the tubular damper in normally extended position is greater than the outside diameter of said coil spring in normally extended position.

4. The combination of claim 2 wherein said inverted cup comprises means to restrain outward lateral movement of the adjacent portion of the tubular damper.

5. The combination of claim 2 wherein said housing base comprises means spaced inwardly from the side wall of the housing to restrain outward lateral movement of the adjacent portion of the tubular damper.

References Cited in the file of this patent

UNITED STATES PATENTS

| Number | Name | Date |
|---|---|---|
| 1,506,557 | Bird | Aug. 26, 1924 |
| 2,032,659 | Hussman | Mar. 3, 1936 |
| 2,044,649 | Swennes et al. | June 16, 1936 |
| 2,357,120 | Kuebert et al. | Aug. 29, 1944 |
| 2,462,316 | Goodloe | Feb. 22, 1949 |
| 2,519,702 | Robinson | Aug. 22, 1950 |
| 2,520,442 | Schwartz | Aug. 29, 1950 |